Jan. 12, 1965                E. A. ROCKWELL                3,165,031
                          HYDRAULIC BRAKE BOOSTER
Original Filed June 23, 1955                              5 Sheets-Sheet 1
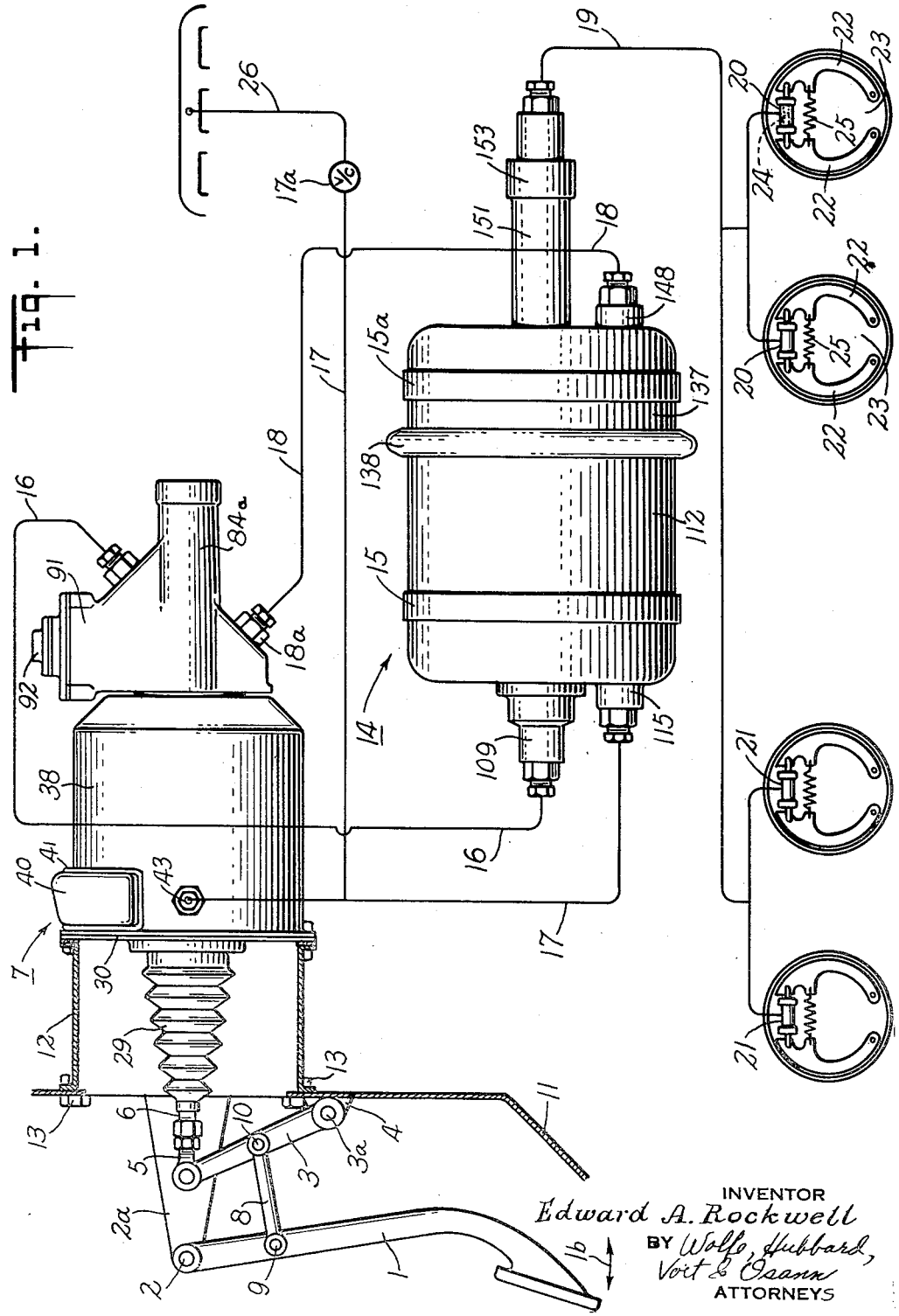
INVENTOR
Edward A. Rockwell
BY Wolfe, Hubbard,
Voit & Osann
ATTORNEYS

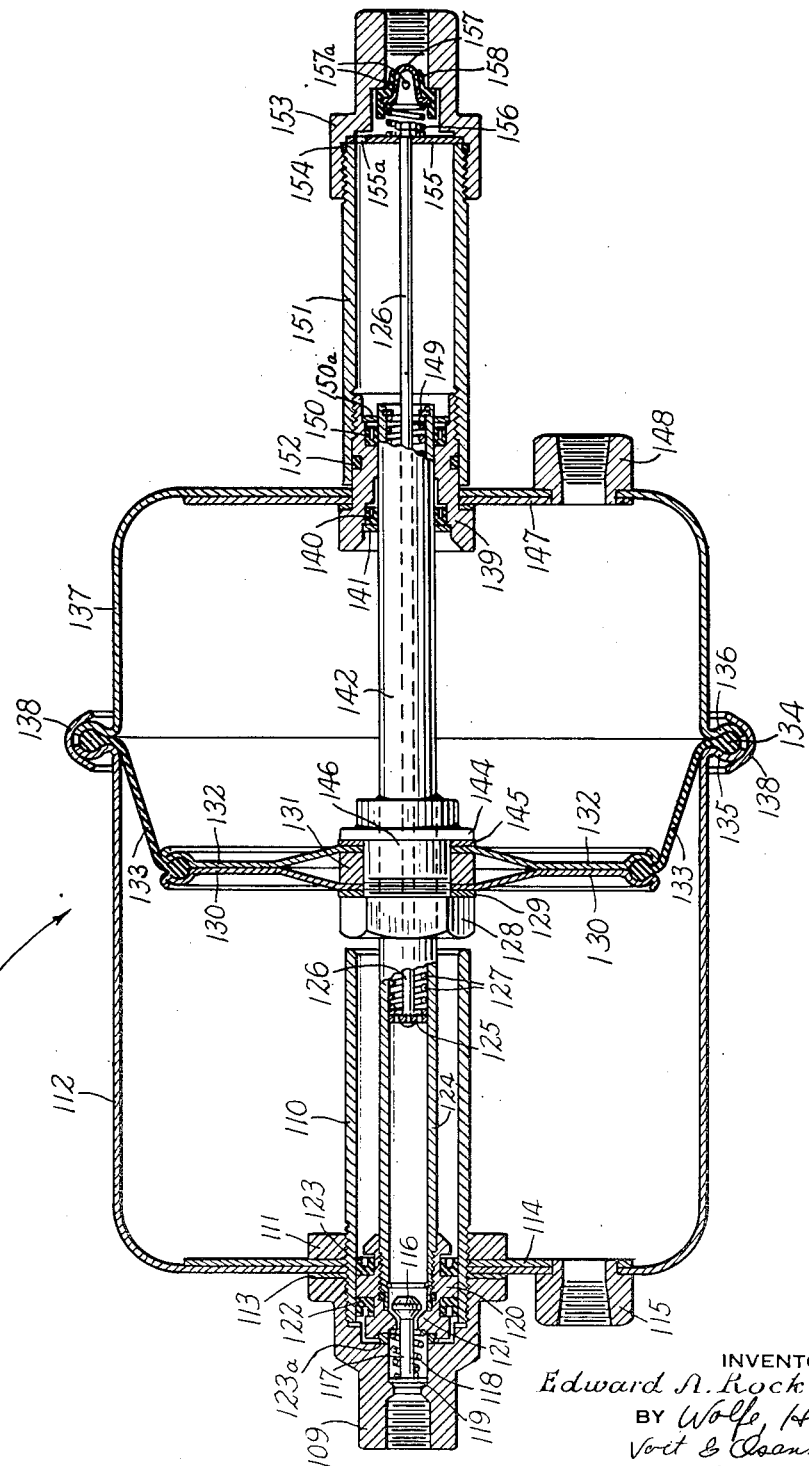

Jan. 12, 1965  E. A. ROCKWELL  3,165,031
HYDRAULIC BRAKE BOOSTER
Original Filed June 23, 1955  5 Sheets-Sheet 3
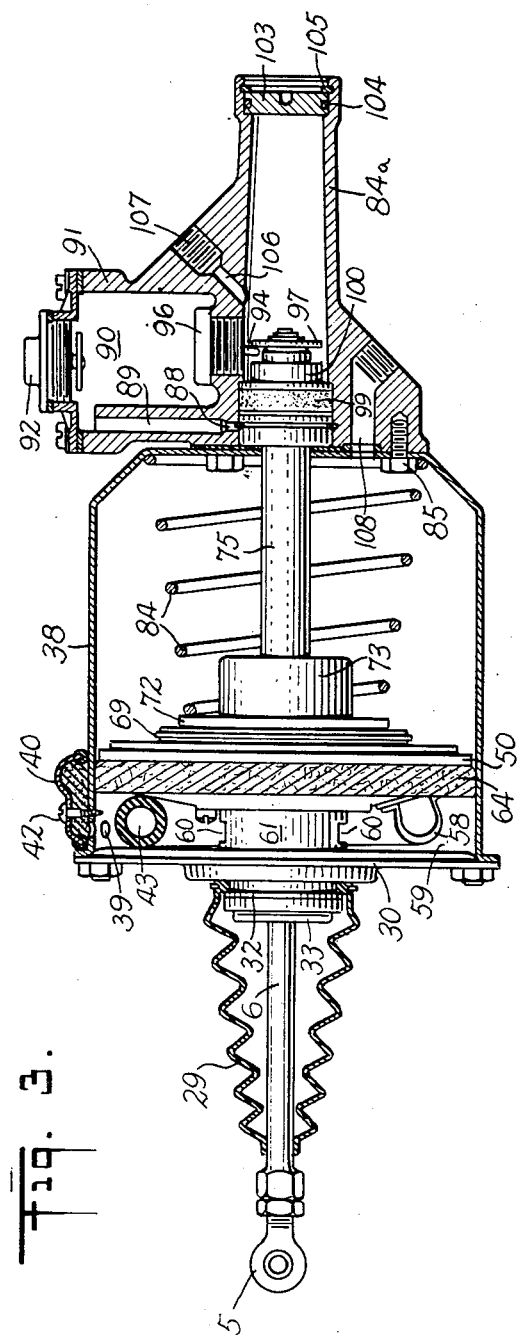
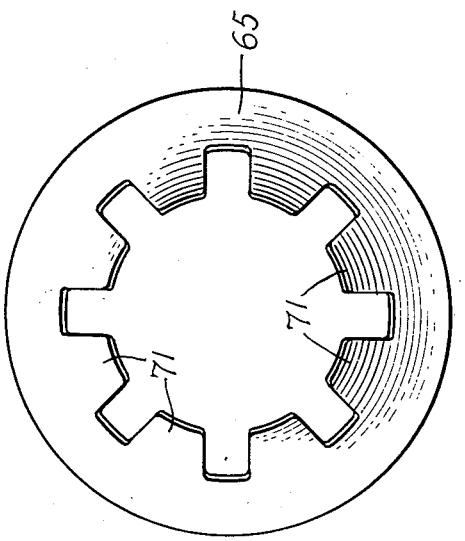
INVENTOR
Edward A. Rockwell
BY Wolfe, Hubbard,
Voit & Osann
ATTORNEYS

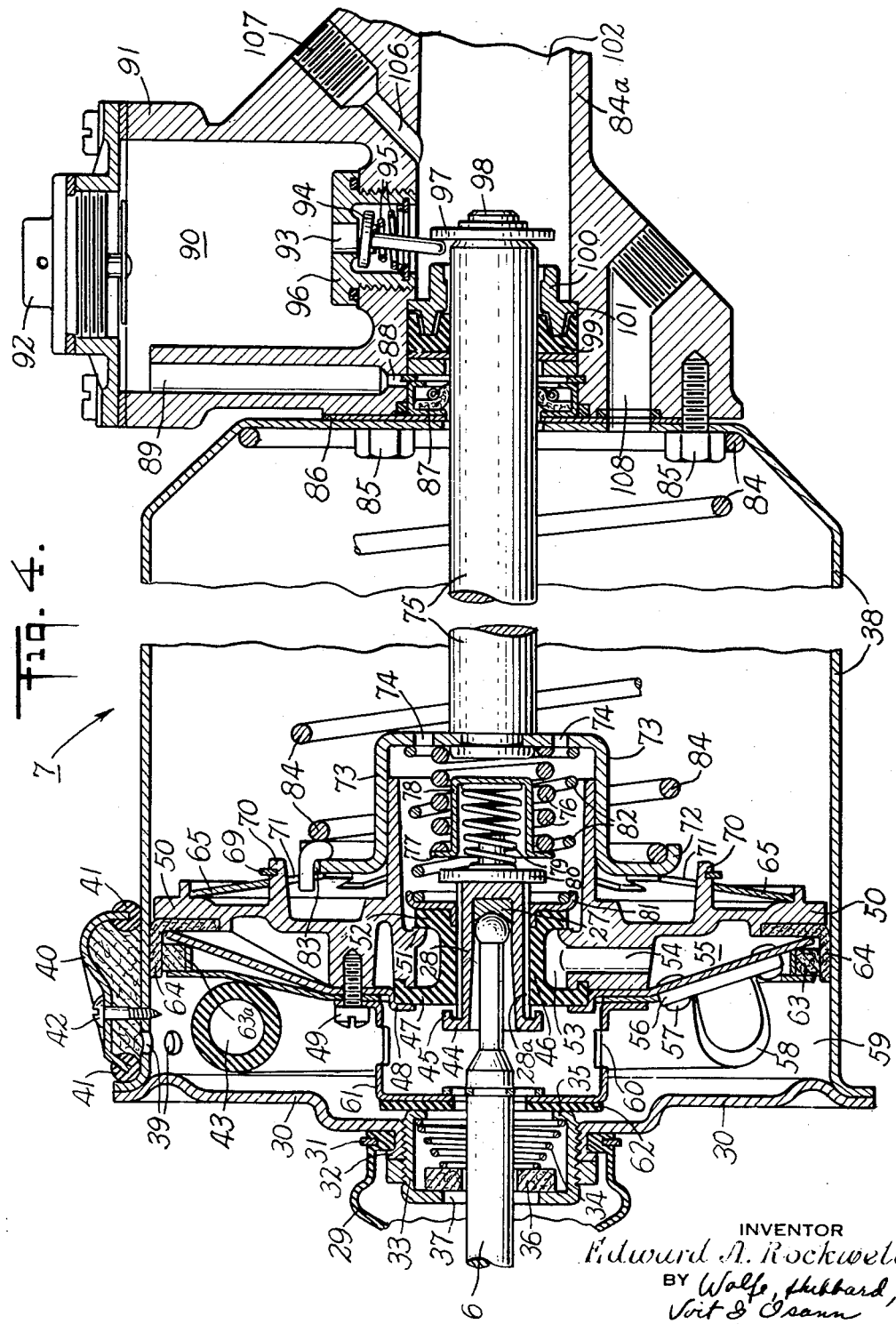

Jan. 12, 1965     E. A. ROCKWELL     3,165,031
HYDRAULIC BRAKE BOOSTER
Original Filed June 23, 1955     5 Sheets-Sheet 5
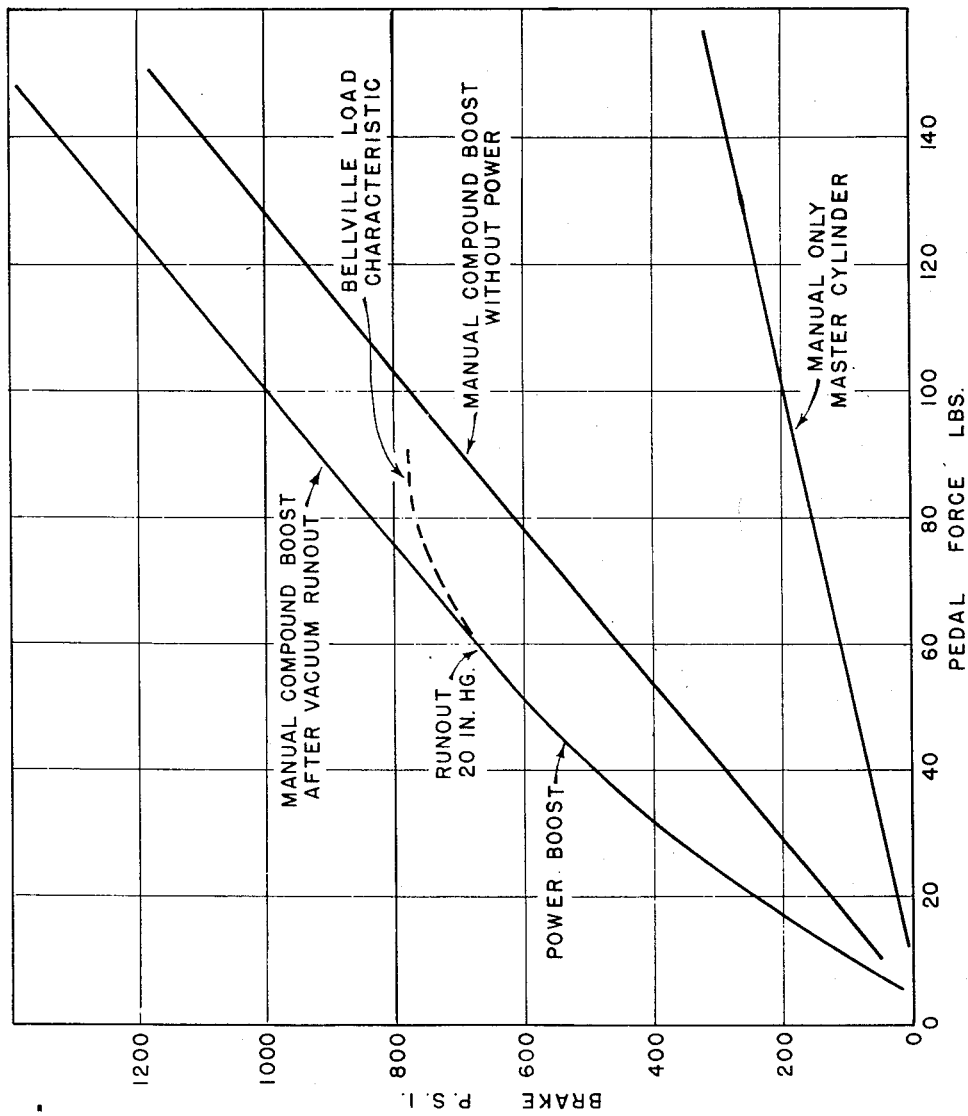
INVENTOR
Edward A. Rockwell
BY Wolf, Hubbard,
Voit & Osann
ATTORNEYS

United States Patent Office 3,165,031
Patented Jan. 12, 1965

1

3,165,031
HYDRAULIC BRAKE BOOSTER
Edward A. Rockwell, 167 Ashdale Place,
Los Angeles 49, Calif.
Original application June 23, 1955, Ser. No. 517,413, now Patent No. 2,978,871, dated Apr. 11, 1961. Divided and this application Dec. 31, 1959, Ser. No. 863,330
19 Claims. (Cl. 91—369)

My invention relates generally to manual control of power and more particularly to manually controlled power booster units for hydraulic brake systems of automotive vehicles.

This application is a division of my copending application, Serial No. 517,413, filed June 23, 1955, now Patent No. 2,978,871, which is directed, in its more specific aspects, to a hydraulic brake system including a power booster unit operated manually from the brake pedal, and a compound hydraulic booster. With power available, illustratively in the form of vacuum supplied to the power booster unit, manual force on the brake pedal is boosted by the power booster unit to increase the fluid pressure in the lines of the system. If, however, there is no power available, due to failure of or run-out of vacuum, the compound hydraulic booster of the system is automatically brought into operation to provide a compound hydraulic boost of manual force on the pedal to provide sufficient hydraulic pressure in the lines to stop the vehicle.

While said Patent No. 2,978,871 is directed to the system including the compound hydraulic booster effective after power run-out, this application is directed to the pedal-operated power booster unit.

The present invention incorporates improvements over a number of my prior patents including Patent Nos.:

2,388,220—Valve Apparatus
2,448,464—Pressure Fluid Operated Pressure Intensifying Mechanism
2,603,066—Tandem Power Unit for Applying Hydraulic Pressure
2,646,665—Fluid Pressure Intensifying Means
2,787,287—Fluid Control Valve Construction
2,794,320—Power Augmentation Apparatus for Hydraulic Motor Systems.

Each of these patents discloses a valve constructed using grommet-type valve elements. In Patent 2,388,220, a three-way valve using a grommet is arranged on the power wall of a power unit to provide a "self-lapping" action, and in Patent 2,794,320, such a self-lapping valve is shown constructed so that it is balanced in the lapped position of the valve elements. In Patent 2,646,665, such a self-lapping valve is mounted on the input member and reaction springs are provided between the power wall and the input member to exert an accurately controlled reaction force on the pedal for proper feel of the braking force.

One of the objects of the present invention is to provide a power booster unit in which the input and output members are arranged both as pushers in longitudinal alignment on the center axis of the power wall, and employing a self-lapping valve incorporated in the power wall rather than mounting the same on the input member as in Patent 2,646,665, with reaction means for stabilizing the operation of the valve in the wall.

A further object is to provide reaction means for such a three-way self-lapping valve construction which affords a variable output-to-input boost ratio, as in Patent 2,646,- 665, and to control such reaction means so as to obtain a gradually and smoothly decreasing output-to-input boost ratio upon increase in pedal force throughout the range of booster unit operation.

2

Another object is to provide improvements in constructions and mountings of power booster three-way grommet valves so that such valves may be directly pedal operated through a push rod, and to provide more effective means for applying reaction from the power wall through the valve to the input member to obtain better valve action, and smoother over-all performance of the unit.

Other objects and advantages will become apparent as the following description proceeds, taken in connection with the accompanying drawings, in which:

FIGURE 1 is a diagrammatic view illustrating the hydraulic booster in an automotive brake system;
FIG. 2 is an enlarged vertical sectional view of the emergency slack take-up and run-out compound booster unit;
FIG. 3 is an enlarged vertical sectional view of the power booster unit;
FIG. 4 is another enlarged vertical sectional view of the power booster;
FIG. 5 is a chart having curves showing the relationship between the pedal force in pounds and the brake pressure in p.s.i. of the master cylinder alone; of the compound booster without power; and of the power booster combined with the compound booster; and
FIG. 6 is an elevational view of the belleville spring.

Referring to the drawings, the present invention is shown in FIGURE 1 in an automotive brake system manually operated by means of a pedal 1, or treadle, having a pivotal support 2 on a bracket 2a provided on the fire wall. The motion of the pedal is used to actuate a hydraulic booster unit which comprises the subject of this invention. A linkage is provided for this purpose including a secondary lever 3 having a pivotal support 3a located on a bracket 4 on the fire wall. At the top of the secondary lever 3 there is a clevis pin connection 5 for connection to a push rod 6, which terminates within the hydraulic booster unit 7. The pedal 1 is connected to the secondary lever 3 by a link pivotally supported at each end 9, 10. The linkage is so arranged as to require merely a short range of movement of the pedal 1 as indicated at 1b by the arrow showing the range of movement of the bottom of the pedal with regard to a floorboard 11 of the automobile. This range of movement may be of the order, for example, from 2" to 3", whereas the movement of the clevis pin 5 for the actuation of the brake may have a total movement of about 3". It is evident that variations of this relative travel can be achieved by changing the fulcrum points 9 and 10. The booster unit 7 is supported on the dash by a mounting bracket 12 which is fastened to the back of the dash by bolts 13, in the engine compartment, the booster 7 having for this purpose appropriate mounting holes, formed in a flange of the cylinder of the unit 7. A slack take-up and run-out compound booster unit 14 is preferably mounted on the automobile frame near the booster unit 7, in the engine compartment, by suitable brackets 15 and 15a. This unit 14 is connected to the booster unit 7 hydraulically by a tube 16 and by a vacuum hose connection 17, leading, for example, to a vacuum check valve 17a and the engine manifold, and by a hose connection 18 with a screw-threaded boss 18a, for transmitting to the unit 14 the control pressure acting upon a booster piston in the unit 7. The output of the unit 14 is connected hydraulically by a tubing 19 to wheel brake cylinders 20 and 21 on the front and rear wheel brakes, respectively. The brake shoes 22 are mounted on wheel backing plates 23 and are moved into operation by brake pistons 24, in the cylinders 20 and 21, and are retracted by pull-back springs 25.

The vacuum connection 17, leading to the booster units 7, 14 from the vacuum valve 17a, connects the units to the intake manifold of the automobile through a tube 26.

According to one of the features of the invention, the input and output members of the power booster unit 7 are arranged on the center axis thereof to act as pushers, such that forward movement of the input member or push rod 6, in response to brake pedal movement, produces forward movement of the output member or power plunger 75. Thus as shown in FIGURE 1, operation of the pedal lever 1 results in pushing forwardly the push rod 6. The push rod 6 is effective to operate a three-way valve mechanism of the power booster unit which modulates the fluid pressure effective on the power wall and which, in keeping with the invention, is similarly carried on the center axis of the unit and is incorporated in the power wall 50 of the unit. Such push rod 6 is in contact with a wear plate 27 in an air valve member 28 having outer flutings 28a. The push rod is also housed in a collapsible rubber boot 29 attached by its small end to the rod 6 and at its larger end to a stamped head 30 of the booster unit 7 by a split ring 31 overlying a recessed flange 32 on said head 30. The flange 32 is screw-threaded to receive a spring casing 33, comprising an adjustable end position stop, having a helical spring 34 therein seated at one end against a flange 35 on the inner end of the casing 33, and at the other end against a flat gasket 36 which seals an air vent opening 37 in the spring casing and permits slight angular movement of the push rod 6. The head 30 is fastened in any desired way, such as by cap screws and nuts through mating flange lugs, as shown in FIGURE 1, to a cylindrical booster cylinder shell 38, which carries air vent openings 39 carrying an air filter cover 40, having a loose peripheral gasket 41, secured in place by means of a screw 42. A vacuum port 43 is also provided, in connection with the pipe 17.

As above referred to, the rod 6 fits within the air valve member 28, the periphery of which is fluted and has a forwardly located peripheral flange 44 which has a rearwardly directed annular lip 45 normally spaced away from the forward face of an annular grommet valve 46 of rubber or rubber substitute, which is similar in construction to the grommet valve disclosed in my Patent No. 2,987,287 upon Fluid Control Valve Construction, which is a division of my Patent No. 2,448,464. The grommet 46 has at the front an outwardly directed flange 47 held in place by a ring 48 and screws 49 on a piston 50, which latter has a valve seat 51 to receive a rear flange 52 located on the grommet 46. The grommet 46, furthermore, has between the flanges 47 and 52 an annular vacuum chamber 53 which communicates by a radial passage 54 with a recess 55 in the piston 50 over which there is a clamping cover plate 56 held in place by the screws 49 and by screws 57 to provide a tight connection to a flexible tube 58 of rubber or rubber substitute fastened to the vacuum port 43.

The longitudinal grooves between the flutings 28a on the air valve member 28 surrounded by the tubular center of the grommet 46 provide an air passageway through the power wall or air suspended piston 50 for flow of air under the control of the valve member 28 in cooperation with the grommet 46. Such air flow leads by the passage beneath the lip 45 to a forward air space 59 and to openings 60 in a shell 61, which is also held in place by the screws 49. With air flow cut-off, by moving the valve member 28 forward to engage the lip 45 of the air valve member with the forward face of the grommet 46, the pressure in the chamber ahead of the power wall and defined by the casing will be modulated upon opening the vacuum valve, thus causing the power wall to move forward gradually. The lapped position of the valve mechanism is that prevailing with the lip 45 in contact with the grommet 46. Further forward movement of the push rod 6, relative to the power wall 50, causes the grommet to move forwardly lifting the flange 52 of the grommet off the valve seat 51 and connecting the space ahead of the power wall to the vacuum chamber 53, which is connected to a source of vacuum. The valve is "self-lapping" in that the flange 52 of the grommet will be caused to seat on the valve seat 51 upon forward movement of the wall, and progressive increments of movement of the push rod 6 will cause the valve mechanism to modulate the pressure in the chamber ahead of the wall and thereby the differential pressure on the opposite sides of the power wall.

The forward end of the shell 61 carries a flexible disc of rubber 62 to act as a stop in the return movement of the piston 50. It will be noted that the shell 61 also extends outwardly so as to hold in place a lubricating felt ring 63 overlying the outer periphery of the ring 48 and, together with a spring ring 63a, so as to hold in sealing position an outer right-angular piston ring leather seal 64 located on the forward face of the piston 50. On the rear face of the piston 50 there is located a belleville vacuum control spring 65, of the type shown in FIG. 6. The inner periphery thereof is retained in place by a split ring 69 in a notched flange 70 formed by suitably spaced lugs extending through the star-shaped openings in the belleville spring 65 on the piston 50. Said inner periphery of the spring 65 has, furthermore, inwardly directed fingers 71 which are adapted to press rearwardly, under the influence of the vacuum, against a forward flange 72 of a spider shell 73 having perforations 74, and a power plunger 75. Said shell 73 also serves as a support for one end of a heavy helical spring 76, the other end of which is received on the outer flange 77 of a spring-retainer casing 78 within which there is a lighter spring 79, resting at its forward end against a ring 80 bearing against the air valve 28. There is also a helical balancing spring 82, having an exact and relatively high rate and a very low initial force, seated at one end on the spider shell 73 and at the other end on a ring 81 on the grommet flange 52. Furthermore, it will be noted that the spider shell 73 carries on its periphery in a notch 83 one end of a helical return spring 84 which is seated at its other end at the end of the booster shell 38 which it will be seen will locate the piston 50 and tube 58 in the correct index position.

It has been known before in a full power valve, as in my Patent 2,244,966, to provide a gradual change in the ratio of pedal travel to brake line pressure so that the travel of the pedal is shorter upon progressive increments of movement of the brake pedal. According to the present invention, however, a power booster unit is constructed to have a boost ratio which gradually decreases with progressively stiffer reaction from an initial high ratio with a soft pedal action.

This is diagrammatically illustrated by the upper curve of FIG. 5 up to the point marked "Run-out," which is the boost ratio curve for the power booster unit throughout the range up to power run-out, in the absence of manual boost due to the compound hydraulic boost unit.

In carrying out this feature the movable, differential pressure responsive wall 50 includes a rear section 73 connected to the plunger 75 and slidably mounted on the main or forward section of the wall. Power is transmitted from the main section of the movable wall 50 through a belleville spring 65 which spaces the wall sections. The forward section carries the vacuum valve assembly which is operated by the pedal actuated rod 6. Between the plunger 75 and the valve 28 the reaction springs 76, 79 are arranged in series so that to initially actuate the power unit, with the wall 50 in the left position as shown in FIG. 4, requires deflection of the lighter spring 79. The boost ratio is, accordingly, high, as shown in the upper curve of FIG. 5. During the initial operation the power unit has a very light and easy pedal operation. As the movable wall moves to the right in the power unit upon progressive increments of movement of the push rod 6, the plunger 75 is effective to increase the pressure of the brake fluid in the master cylinder to force the fluid into the lines leading to the brakes and apply the brakes. As the wall 50 moves to the right (FIG. 4) and the plunger advances in the master cylinder, the reaction force increases reflecting additional power supplied from the movable wall. The belleville spring therefore yields, which decreases the spacing between the rear wall section 73 and the main or forward section of the wall. This drawing together of the wall sections tends to compress the light spring 79 so that the force required to deflect this spring 79—and open the vacuum valve—progressively increases. In addition, the spring 82 must be overcome to move the lip 52 of the grommet 46 away from the vacuum valve seat 51. After the wall sections draw together as the belleville spring deflects, to a position where the face of the flange 80 on the valve member touches the lip 77 on the spring retainer when the vacuum valve is operated, to open the vacuum valve the heavier spring 76 must be overcome. As mentioned later, the well-known deflection characteristic of the belleville spring; that is, that it is stiff initially and becomes progressively easier to deflect as it deflects toward flat, causes the wall sections to be drawn together at a changing rate having the effect of modifying or altering the reaction springs so that the reaction force portion applied to the power wall becomes progressively less as the power wall moves and the reaction force portion applied to the pedal becomes progressively greater. From this point on the reaction force on the pedal actuated rod 6 is attributable to both springs 76, 79, and also spring 82. As the movable wall moves further to the right developing higher brake fluid pressure, the wall sections draw further together upon continued deflection of the belleville spring. The drawing together of the wall sections forces the coils of the heavy spring 76 to close so that the reaction force on the pedal actuated rod, which is transmitted primarily through the springs 76, 79, progressively increases and this increase in application of reaction force to the pedal will continue as the wall moves to the right in the casing. The change in reaction force has the effect of decreasing the boost ratio.

This is the condition of the springs that is present as the run-out point is approached. The reaction force applied to the input member through both reaction springs 76, 79 increases until the end of the spring retainer 78 abuts the plunger 75, providing direct action from the pedal against the latter and direct transmission of all reaction force through the pedal, which occurs desirably at the run-out point.

During the period before run-out occurs, the well-known deflection characteristic of the belleville spring the deflection of which is non-proportional to load, is used to alter or modify the reaction force due to the reaction springs 76, 79 acting against the valve member 28, responsive to fluid pressure in the master cylinder. The belleville spring 65 by adjusting the spacing of the wall sections according to the resistance on the plunger, has the effect of gradually compressing the series arranged reaction springs 76, 79, and the spring 82, and thereby modifying the reaction force, smoothing the transition from the lighter reaction spring 79 to the heavier spring 76 and from the latter to direct action against the plunger at the run-out point. The belleville spring provides means for altering the effect of the reaction springs so that the output-to-input boost ratio gradually decreases as shown by the upper curve of FIG. 5, to a predetermined boost ratio at a point approaching run-out. In the present case the reaction springs 76, 79 and the belleville spring 65 are selected so that the boost ratio as run-out is approached is the uniform boost ratio of the compound boost alone. Any additional force applied manually to the pedal and actuating rod 6 after run-out is transmitted directly to the plunger 75. The output-to-input boost ratio curve without compound hydraulic boost is shown in FIG. 5 as the "Power Boost" curve which would meet at power run-out and continue with the same characteristics as the "Manual Only Master Cylinder" curve also shown in this figure. The "Power Boost" curve in FIG. 5 is shown extended onto the "Manual Compound Boost" curve, illustrating the characteristic of a system with both power boost unit 7 and compound hydraulic boost unit 14, which is the subject of the parent application, now Patent No. 2,978,871, of which this is a divisional application.

Referring to FIG. 5, the curves show diagrammatically the effect of the arrangement of springs on the reaction force felt on the pedal. The pedal force is plotted on the horizontal axis of the chart in FIG. 5 while the brake fluid pressure is plotted on the vertical axis. The curves, therefore, show the boost ratio. As explained previously, a light initial force is required to move the pedal which progressively increases after movement of the pedal to shift the movable wall away from the left end and wall toward the right end of the casing (FIG. 4). At any given position of the movable wall, the pedal force is determined by the spacing of the wall sections as reflected in the condition of each spring, that is, whether compressed partially or fully. The spacing of the wall section is, in turn, determined by the force due to the pressure of the brake fluid reacting through the plunger and the belleville spring. As this latter force increases, because of the deflection characteristic of the belleville spring the spacing of the wall sections is reduced at a changing rate, which is reflected in the varying pedal force depicted in the upper curve of FIG. 5 until run-out.

As shown in FIG. 5 the middle curve is a straight line showing the uniform boost ratio of the manual compound boost unit without power. After run-out the combined boost ratio curve, the upper curve in FIG. 5, has the same slope as the manual compound boost without power. The upper curve in FIG. 5 shows that the boost ratio of the power booster unit is the same at a point approaching run-out as the boost ratio of the compound boost unit, while initially the power booster unit has a much higher boost ratio. This same curve shows that the boost ratio of the power booster unit gradually decreases from the initial high ratio to the lower uniform ratio of the manual compound boost. This change in boost ratio is brought about by the association of the belleville spring with the reaction springs between the plunger and the vacuum valve which provides a smoothly varying reaction force imposed successively by the light reaction spring 79 and the heavier reaction spring 76, the transition therebetween and the characteristics of which are altered by the belleville spring.

The power plunger 75 extends through the end of the booster shell 38 into a master cylinder casing 84a, to which it is attached by screws 85 and a gasket 86, provided with a packing gland 87, having a hydraulic port 88 leading by a passage 89 to a reservoir chamber 90 in a master cylinder reservoir 91, having a vented cover 92. Liquid is arranged to flow therefrom through a port 93, past a tiltable check valve 94 normally seated by a spring 95 in a screw-threaded valve retainer-casing, but which is tilted by the return of the plunger 75. The slight opening of valve 94 in the retracted position of the plunger can be adjusted by the stop 33 screw-threaded in the head 30. The valve is tilted by means of a ring 97 fastened to the end of the plunger 75 by a snap ring 98 set in a suitable groove in a reduced portion on the end of the plunger 75. The spring 95 is relatively light and will permit opening under slight vacuum to replenish the system. On the plunger 75 there is also a lip seal 99, held in place by a guide bushing 100 in an annular recess 101, within a cylindrical bore acting as a master cylinder 102 closed by a plug 103 and seal 104 held in place by a snap ring 105. An outlet passage 106 leads from the cylinder 102 to a screw-threaded port 107, to receive the usual pipe fitting, from which the pressure liquid is delivered to the pipe 16.

The screw-threaded boss or pipe fitting 18a, is located in the casing 84a where it leads by a passage 108 to the interior of the booster cylinder 38. In this manner the controlled vacuum passageway 108 leads to the pipe 18, connected to the slack take-up unit 14, and which is thus connected to the booster unit 7 by the pipe 16, and supplied with vacuum by the pipe 17. The hydraulic liquid delivered to the unit 14 by the pipe 16 enters a boss 109 screw-threaded to a plunger cylinder 110 having a nut 111 thereon on the inside of a slack take-up shell 112 carrying between the nut 111 and the boss 109 a gasket 113 on the outside of the shell 112, and on the inside of the shell 112 a plate 114 for receiving the inner end of a boss 115 having therein a thread to receive a pipe fitting for the vacuum pipe 17. The controlled hydraulic pressure received by the pipe 16 serves initially to pass by an unseated liquid shut-off valve 116 on a valve stem 117 having a helical spring 118 around the stem and fastened thereto by a suitable snap ring, one end of which rests against a perforated stop washer 119 press fitted into a bore in the boss 109, the said other end of the spring 118 being supported by a piston 120 having a valve seat 121 for the conical rubber valve 116. The piston 120 is located within the cylinder 110 and is provided with lip seals 122 and 123 within said cylinder, one of which seals is adapted to seal under brake pressure fluid and the other of which is to prevent the atmosphere entering the brake line under operating conditions. There is a rubber faced valve 23a molded in a suitable groove in the piston 120 for closing off the full area of said piston and for having an area approximately equal to the outside area of a plunger 124. Screw-threaded in the piston 120 there is the plunger 124 forming a part of a plunger 142 hereinafter referred to. The plunger 142 comprises a cylindrical spring casing, carrying therein a slidable perforated ring 125, having attached thereto a stem 126 provided with a long helical spring 127 around the same, and held in place by a terminal nut and lock nut 127', which, when extended, tends to supplement the pedal action and to apply the brakes. The said spring casing 124, 142 has a retaining boss of copper brazed thereon. A nut 128 screwed on the boss clamps in place, through a gasket 129, a forward diaphragm clamping plate 130 which is spaced by a ring 131 from a rear diaphragm clamping plate 132. The plates 130, 132 clamp between their peripheries the inner beaded edge of an annular flexible rubber diaphragm 133, the outer periphery of which is provided with a bead 134 clamped between the slack adjuster shell 112 by means of a flange 135 thereon and a flange 136 on a rearwardly directed slack adjuster shell 137. A split annular channel 138 clamps the flanges 135 and 136 together. The rear shell 137 has a central boss 139 passing through the end of the shell 137 to receive, within a seal 140 held in place by a retaining ring 141, the cylindrical plunger 142 which is part of the same tube as the plunger 124, but the outer surface of which is highly finished to slide in rubber seals 140 and 150. The plunger 142 is clamped to the diaphragm plate 132 by a flange 144 and a gasket 145, by means of nut 128. The boss 139 also serves to clamp against a plate 147, spot welded to the shell 137, which has fastened thereto a boss 148 which is connected to the pipe 18. The rearward end of the spring 127 is supported by a split ring 149 within the end of the tubular plunger 142 and on the outside of said plunger there is an additional lip seal 150 within the boss 139 and a retaining washer 150a. On the outside of the boss 139 there is, furthermore, screw-threaded a high pressure cylinder 151 having a ring seal 152. At the rear end of the cylinder 151 there is a screw-threaded fitting 153 with a seal 154 which is provided with a threaded opening to receive the pipe fitting for the pipe 19 to the brake cylinders 20 and 21. The rear end of the spring retaining stem 126 is fastened by nuts to a plate 155 having a hole 155a at the top thereof to aid in the elimination of all air from the system initially. The plate 155 is held in place between the fitting 153 and the cylinder 151. The plate 155 also supports a helical spring 156 on its rear face, which provides a bias to a residual pressure check valve 157 extending into a lip seal 158 having a spring rate in relation to the effective area of the valve to provide a residual pressure on the release of the brakes of from 7 to 10 p.s.i., while permitting a free flow through holes 157a and the check valve lip 158.

To summarize the operation of the apparatus, it will be first assumed that the vehicle upon which the device is installed is running normally with vacuum from the intake manifold being supplied through pipes 26 and 17 to the annular recess 55 in the vacuum booster unit 7 and to the interior of the shell 112 of the hydraulic booster unit 14. In the vacuum booster unit 7 the pressure on each side of the power piston 50 will be atmospheric, since air may enter openings 39 and can reach the opposite side of the piston through the air control valve 45. Thus this piston 50 is urged to the left in FIG. 4 by spring 84. In hydraulic booster unit 14 the compound plunger 120, 124, 142 will be held by air pressure in its FIG. 2 position since the shell 112 is evacuated and the shell 137 is connected to the atmospheric pressure in shell 38 of unit 7. It will be noted that the long spring 127 in unit 14 will be compressed by air pressure exerted against diaphragm 133 and the structure of the compound plunger.

When the brake pedal 1 is actuated, actuating rod 6 will move to the right in FIG. 4, sliding the valve member 28 to first close the air control valve 45 and then open the vacuum control valve 51. Closing the valve 45 prevents air from passing from the left of the power piston 50 to its right, and opening valve 51 connects the interior of shell 38 at the right of piston 50 to the annular recess 55 and the source of vacuum. Thus, as the shell 38 is evacuated, the air pressure force on the left of the power piston 50 strongly "boosts" the manual force exerted through the actuating rod 6, and together these forces move hydraulic plunger 75 into chamber 102, which closes the supply valve 94 and forces hydraulic fluid into the tube 16.

The fluid from tube 16 is free to pass through the hydraulic booster unit 14 by being admitted through the open valve 116 and entering the hollow compound plunger 120, 124, 142. From the plunger 142 the fluid is free to flow into high pressure cylinder 151 and from there to the line 19 for operating the brakes.

So that brake pedal 1 need be operated only through a short range, the plunger 75 is large enough to displace sufficient fluid to actuate the brakes when moved only a short distance. Moving such a large plunger requires considerable force which normally is supplied by the vacuum power booster unit 7. If, however, there is no power boost available, the average driver does not have the strength to apply sufficient manual pressure to the brake pedal 1 to bring the automobile to a safe stop, and for this reason the hydraulic booster unit 14 is provided.

The vacuum power boost is not available in two major cases. First, if there is a vacuum supply failure, no pressure differential can be created on opposite sides of the power piston 50 and thus no power boost can be provided. Second, the vacuum boost unit 7 can provide boosting power only up to a condition which is called the "run-out" point. The run-out condition exists in unit 7 when the differential air pressures on the piston 50 equals the resisting force of the return spring 84, and it is not possible to further evacuate the shell 38 at the right of the power piston since the vacuum therein is already equal to the vacuum source in line 17. In other words, the available supply of additional power-boosting vacuum has "run-out." In this latter case there is, of course, considerable force exerted by the booster unit 7 even though it is in the run-out condition, but often further movement of plunger 75 is required due to: (1) the development of slack in the hydraulic system which is caused by the heat expansion of the brake drums away from the brake shoes, and (2) to compensate for brake fading conditions.

When there is a vacuum failure or when the run-out condition is approached in unit 7, the hydraulic booster unit 14 is effective to automatically provide a compound hydraulic power boost so that normal manual pressure on pedal 1 will be sufficient to stop the automobile. This is accomplished by the automatic shift of the compound piston 120, 124, 142 to the right in FIG. 2 when there is a vacuum failure or when the run-out condition in unit 7 is approached. In the case of a vacuum failure there exists equal atmospheric pressure in each of the shells 112 and 137 and the compressed spring 127 will, therefore, shift the piston to the right. Or, in the case of an approaching run-out condition, the shell 137 will be evacuated due to the tube 18 connection from the vacuum boost unit 7 and, therefore, as an equal vacuum in shells 137 and 112 is approached, the compressed spring 127 will force the piston to the right.

When the compound piston 120, 124, 142 moves to the right, the fluid seal 116 closes under the urging of spring 118 since the seal stem 117 no longer engages washer 19 to hold it open, and the seal 123a moves away from the boss 109 to expose the face of piston 120. Thus, the fluid pressure manually imposed by plunger 75 and transmitted through pipe 16 impinges against the plunger 120 and forces it along its cylinder 110, which in turn simultaneously forces the plunger 142 into the high pressure cylinder 151. Plunger 120 is larger than plunger 75, thus the manual force exerted by the plunger 75 is hydraulically multiplied and the plunger 120 exerts a higher force on plunger 124, 142. Plunger 124, 142 is smaller than plunger 120 and thus its movement builds up a higher fluid pressure in high pressure cylinder 151 than exists in cylinder 110. This combination of multiplying forces and increasing fluid pressures resulting from the relative sizes of the plungers 75, 120 and 124, 142 produce a substantial hydraulic boost which is almost a continuation of the effect of the vacuum power boost discussed above, see FIG. 5.

The following are examples of relative dimensions which are desirable and effective for use with a vehicle weighing in the neighborhood of 4000 lbs.:

Hydraulic power plunger 75 diameter ¾", effective stroke 2.891 in., volume 1.275 cu. in., vacuum power piston 50 diameter 6 in., vacuum power piston stroke 3.054 in. and belleville spring 65 deflection.

Run-out booster, small plunger 142 diameter 21/32", large piston 120 diameter 1 3/16", diaphragm clamping plates 130 and 132 6" outside diameter, reservoir shell inside diameter 7", static volume 1.115 cu. in. with small plunger 142), effective stroke 3", required volume before reserve for stretch and wear of brake linings .677 cu. in., total required volume .967 cu. in. for static conditions. With the present invention and utilizing the same size vacuum booster cylinder as on current models, the combined available volume displacement for the operation of the brake shoes with the above example of dimensions would be 1.303 cu. in. and without power under static conditions would be 1.115 cu. in. The long slack take-up spring 127 can have a force of 20 lbs. in retracted position and 18 lbs. in the full stroke position. The force of the spring 127 is sufficiently low to just take up the brake shoes and overcome the pull-back springs 25 and 26.

It will be recognized that when the hydraulic booster unit 14 is brought into operation additional fluid must be supplied to the hydraulic lines. This is because plunger 75 must move a substantial amount of fluid into cylinder 110 in order to move the plunger 120 and produce the hydraulic boost desired. This additional fluid is supplied to valve 94 from the reservoir 90 when the plunger 75 is returned or partially returned under the urging of spring 84 so as to relieve the pressure in cylinder 102 to allow the compressed spring 127 to move plunger 120 and draw fluid past the valve 94 into the hydraulic system.

I utilize the well-known deflection characteristic of the belleville washer to control the manual reaction springs 79 and 76 in their application of reaction force to the pedal—for example, the initial reaction force of the spring 79 may be as low as 5 lb., whereas the force of the spring 76 would have a value of 60 lb. in its fully compressed position and would represent a point at which the booster runs out, for example at an intake manifold pressure of 20 in. Hg. This arrangement will give, initially, a high rate of boost at the beginning equal almost to full power, so that braking initially can be controlled with very light forces on the pedal.

The belleville washer due to its changing deflection characteristic under load is stiff to start with and becomes progressively easier to deflect as it flattens out. Reaction springs 76, 79 have the usual deflection characteristic of springs, i.e. they exhibit proportional deflection under load. It will be clear from FIG. 4 that the total reaction force from the output member or plunger 75 is applied (1) through the yieldable connection provided by the belleville spring 65 to the wall 50, and (2) through the resilient reaction springs 76, 79 to the actuating rod 6 or input member. With the wall in its left-hand position as viewed in FIG. 4, the connection provided by the belleville washer 65, due to its initial stiffness applies substantially all of the reaction force to the power wall. As the wall 50 moves to the right in the casing upon continued operation of the actuating rod 6, the reaction force from the plunger 75 increases and the belleville washer 65 yields and becomes easier to deflect while the reaction springs 76, 79 are compressed and become progressively stiffer. As a result, the belleville washer 65 transmits progressively smaller portions of the total reaction force to the wall 50, and hence greater portions of the total reaction force are directed to the rod 6 and the operator's foot. Thus, as the power wall moves and the reaction force increases, the yieldable connection between the power wall 50 and the output member yields and gradually shifts an increasing portion of the reaction force to the input member.

As the belleville spring 65 is deflected the stiffer reaction spring 76 acts at a fast rate, whereas the belleville spring 65, as it deflects towards flat, diminishes its rate of increase. In fact, it would have a negative rate even before it approaches flat. There is a stop 65a, however, to control the limit of its deflection. It will be understood the action of this spring can be modified within limits to suit various requirements by suitable stops and cutouts in the spring, etc.

The purpose of the high rate spring 82 is gradually to increase the closing pressure of the vacuum valve 51 to offset the increased difference of pressure across the grommet valve due to the atmosphere on one side and the increasing vacuum admitted past the valve on the other side. The spring initially is only very slightly compressed but the movement of the vacuum piston 50 relative to the spring 82 compresses the spring, rapidly increasing the vacuum valve closure pressure thus preventing the vacuum valve from opening of its own accord and assuring progressive lap position of the valves.

While I have described my invention above in detail I wish it to be understood that many changes may be made therein without departing from the spirit of the same. In the appended claims, by way of example, in the recited elements or an equivalent thereto, for example, the power device is the booster unit 7, the connection for supplying power is an opening in the unit for receiving the vacuum from the manifold and is indicated at 17a and by the flexible tube 43. The selectively operable member is the treadle lever 1 and the output member is any brake shoe actuator in the wheel cylinders 21 and 20 which receives the manual as well as power pressure. The ratio changing device is the piston 124, 142 and their respective cylinders. The second device is the diaphragm assembly for the diaphragm 133 for cooperating with the ratio changer, the movable wall is the booster vacuum piston 50, the fluid connection to said power connection is the pipe 17b, the valve for controlling the fluid power device is the valves 45 and 52 in the piston 50, the means for applying a manual force at the run-out of fluid power includes the pipe 18 responsive to pressure controlled by the valve, and means to partially apply the brake is the spring 127.

I claim as my invention:

1. In a power booster unit comprising a casing having a power wall actuated by a pressure differential on the opposite sides thereof, an output member connected to said wall, and an input member, the improvement comprising: a follow-up valve mechanism operated by said input member and having a released position, a power position, and a lapped position for controlling the diffferential pressures on the opposite sides of said wall, said valve mechanism including a valve floatingly carried by said wall and a valve element operably connected to said input member and seating on said valve at the lapped position and at one of the other of said positions; and reaction means transmitting reaction force from said output member to both said wall and said input member, said reaction means including a belleville spring, said belleville spring providing a yieldable connection from said wall to said output member, said reaction means further including spring means providing a force lightly opposing initial increments of movement of said valve element with an initially high boost ratio of the force applied to the input member to that applied by the output member, successive increments of movement of said valve element tending to compress said belleville spring causing said connection to yield thereby providing relative movement of said members and the wall, said reaction spring means being arranged to be responsive to the yielding of said connection for gradually increasing said reaction force at a gradually increasing rate upon successive increments of movement of said valve element to gradually decrease such boost ratio and thereby achieve a modified lower boost ratio as power run-out is approached.

2. In a power booster unit comprising a casing having a power wall actuated by pressure differential on the opposite sides thereof, an output member connected to said wall, and an input member, the improvement comprising: a follow-up valve mechanism operated by said input member and having a released position, a power position, and a lapped position for controlling the differential pressures on the opposite sides of said wall, said valve mechanism including a valve floatingly carried by said wall, and a valve element operably connected to said input member and seating on said valve at the lapped position and at one of the other of said positions; and reaction means including a first resilient means for applying a force lightly opposing initial increments of movement of said valve element providing an initially high boost ratio of the force applied to the input member to that applied by the output member, said reaction means including a second resilient means for applying a heavier force opposing successive increments of movement of said valve element, said reaction means further including a variable rate spring connected between said wall and said output member, successive increments of movement of said valve element tending to compress said variable rate spring providing relative movement of said members and the wall, said first and second resilient means being arranged to be responsive to the reltaive movement of said members and the wall so as to gradually increase said reaction force applied thereby at a gradually increasing rate upon successive increments of movement of said valve element to gradually decrease such boost ratio and thereby achieve a modified lower boost ratio as power run-out is approached.

3. In a power unit comprising a casing having a power wall actuated by a pressure differential on the opposite sides thereof, an output member connected to said wall, and an input member, the improvement comprising, a follow-up valve mechanism operated by said input member having a released position, a power position, and a lapped position for controlling the differential pressures on the opposite sides of said wall, said valve mechanism including a valve floatingly carried by said wall exposed to a differential pressure producing a force tending to move said valve, a valve element operably connected to said input member and cooperating with said valve, said valve being movable responsive to movement of said valve element to a power position from a lapped position, resilient means providing reaction force opposing the movement of said valve in the direction toward said power position, means providing a yielding connection between said wall and said output member, and means responsive to the yielding of said connection upon successive increments of movement of said valve for applying a gradually increasing stress on said resilient means to gradually increase said reaction force and balance the force produced by the differential pressure acting on said valve.

4. In a power unit comprising a casing having a power wall actuated by a pressure differential on the opposite sides thereof, an output member yieldingly connected to said wall, and an input member, the improvement comprising, a follow-up valve mechanism operated by said input member having a released position, a power position, and a lapped position for controlling the differential pressures on the opposite sides of said wall, said valve mechanism including a valve floatingly carried by said wall and a valve element operably connected to said input member, said valve being movable responsive to movement of said valve element to a power position from a lapped position, reaction means including a yieldable reaction device and resilient means opposing movement of said valve in the direction toward said power position and tending to return said valve to its lapped position, said reaction means transmitting a portion of the force applied by said output member as reaction force through said resilient means to said valve, the remaining portion of said reaction force being transmitted through said yieldable reaction device to said power wall, said yieldable reaction device having a variable deflection under load and being connected to modify the action of said resilient means so that the reaction force portion applied to said valve gradually increases upon successive increments of movement of said valve element for maintaining the tendency of the valve to return to its lapped position throughout its range of performance.

5. In a power unit comprising a casing having a power wall actuated by a pressure differential on the opposite sides thereof, an output member connected to said wall and an input member, the improvement comprising, a follow-up valve mechanism including a grommet valve sealingly carried on said wall, said input member extending through the hollow center of said grommet valve and cooperating therewith upon axial movement to move the grommet valve between a released position, a lapped position, and a power position, for controlling the differential pressure on the opposite sides of said wall, said grommet valve having a flexible supporting portion exposed to a pressure differential at the lapped position to produce a force tending to move said grommet, and resilient reaction means between said grommet valve and said power wall applying a gradually increasing reaction force opposing successive increments of movement of said grommet valve to the power position, so as to assure the sealed lapped position thereof throughout the range of work performance.

6. In a power unit comprising a casing having a power operated wall actuated by a pressure differential on the opposite sides thereof, an output member, means providing a yieldable connection between said wall and said output member, a follow-up valve mechanism carried by said wall including a valve element exposed to said pressure differential and having a released position, a power position, and a lapped position for controlling the differential pressure on the opposite sides of said wall, a manually operable member for actuating said valve element, resilient means arranged between said valve element and output member so as to balance the force produced by the differential pressure acting on said valve element, means for applying a gradually increasing reaction force opposing actuation of said valve element including a heavier spring in series with a lighter spring between said output member and said valve mechanism, said heavier spring being arranged to yield together with said lighter spring for a predetermined deflection, and means for deflecting only said heavier spring after said predetermined deflection to smooth the transition from the lighter spring to the heavier spring in reacting in opposition to the manually operable member.

7. In a power booster unit including a casing having a power wall actuated by a pressure differential on the opposite sides thereof, said casing defining a modulated pressure chamber on one side of said wall, and an output member extending from substantially the center of one side of said wall, the combination comprising, an input member mounted axially of said output member on the opposite side of said power wall, a follow-up valve mechanism carried by said power wall coaxially of said input and output members including an annular grommet, said grommet having a flexible wall fixed to said power wall for movably carrying the grommet, valve means including a fixed valve seat on said wall and a movable valve seat operated by said input member, cooperating with said grommet upon relative axial movement to provide a released position, a lapped position, and a power position, for modulating the pressure in said chamber, said input member having an end portion connected to said movable valve seat and passing through the hollow center of the grommet leaving a passage adjacent the grommet for air flow to said chamber under the control of said grommet and valve means, said passage being sealed by the movable valve seat in said lapped position, and resilient reaction means connected between said power wall and both said grommet and said input member and applying a gradually increasing reaction force opposing relative movement of said valve means and grommet upon successive increments of movement of said input member.

8. In a power booster unit including a casing having a power wall actuated by a pressure differential on the opposite sides thereof, means including a central forwardly extending annular boss on said power wall for mounting said input and output members in longitudinal alignment on the center axis of said power wall with said output member mounted forwardly of and spaced from said input member and extending from substantially the central portion of the forward side of said power wall, said input member extending through said power wall toward said output member and being mounted coaxial with said annular boss, a valve element carried by said input member, a follow-up valve mechanism carried by said power wall coaxially of said input and output members including an annular grommet concentric with said input member, said grommet having a flexible wall fixed to said power wall for movably carrying the grommet, said valve element cooperating with said grommet upon successive increments of movement of said input member to provide a released position, a lapped position, and a power position, for controlling the differential pressure on the opposite sides of said wall, a mounting element fixed to the output member and slidably received and guided by said annular boss for mounting said output member for movement relative to said power wall, and resilient reaction means connected between said output and input members and extending into said power wall within said boss, said reaction means applying a gradually increasing reaction force upon successive increments of movement of said input member while transmitting the input force to the output member.

9. In a power booster unit including a casing having a power wall actuated by a pressure differential on the opposite sides thereof, means including a central forwardly extending annular boss on said power wall for mounting said input and output members in longitudinal alignment on the center axis of said power wall with said output member mounted forwardly of and spaced from said input member and extending from substantially the center of said power wall, said input member extending through said power wall toward said output member and being mounted coaxial with said annular boss, a valve element carried by said input member, a follow-up valve mechanism carried by said power wall coaxially of said input and output members including an annular grommet concentric with said input member, said grommet having a flexible wall fixed to said power wall for movably carrying the grommet, said valve element cooperating with said grommet upon successive increments of movement of said input member to provide a released position, a lapped position, and a power position, for controlling the differential pressure on the opposite sides of said wall, a mounting element fixed to the output member and slidably received and guided by said annular boss for mounting said output member for movement relative to said power wall, a spring washer between said mounting element and said power wall and tending to be compressed upon successive increments of movement of said power wall, thereby reducing the spacing between said output and input members, and resilient reaction means connected between said output and input members within said boss, said reaction means applying a gradually increasing reaction force responsive to the compression of said spring washer upon successive increments of movement of said input member while transmitting the input force to the output member.

10. In a power booster unit comprising a casing having a power wall actuated by a pressure differential on the opposite sides thereof, an output member connected to said wall, and an input member, the improvement comprising: a follow-up valve mechanism operated by said input member and having a released position, a power position, and a lapped position for controlling the differential pressures on the opposite sides of said wall, said valve mechanism including a valve floatingly carried by said wall and a valve element operably connected to said input member and seating on said valve at the lapped position and at one of the other of said positions; and reaction means including a resilient reaction device providing a reaction force lightly opposing initial increments of movement of said valve element to the power position with an initially high boost ratio of the force applied to the input member to that applied by the output member, said reaction means mechanically acting between said members and between the wall and said members, said reaction means including means modifying the action of said resilient reaction device upon successive increments of movement of said valve element for gradually increasing said reaction force as power run-out is approached.

11. In a power booster unit comprising a casing having a power wall actuated by a pressure differential on the opposite sides thereof, an output member connected to said wall, and a manually operable input member, the improvement comprising: a follow-up valve mechanism operated by said input member and having a released position, a power position, and a lapped position controlling the differential pressures on the opposite sides of said wall, said valve mechanism including a valve floatingly carried by said wall and a valve element operated by said manually operable input member and seating on said valve at the lapped position and at one of the other of said positions; and reaction means including a resilient reaction device, said reaction means mechanically acting between said members and between the wall and said members, said reaction means transmitting a portion of the reaction force which corresponds to the force applied by said output member through said reaction device to said input member to oppose manual movement of said valve element, a further portion of the reaction force being applied through said reaction means to said power wall, said first-mentioned reaction force portion lightly opposing initial increments of movement of said valve element to the power position providing an initially high boost ratio of the manual force applied to the input member to the force supplied by the output member, said reaction means including means modifying the action of said resilient reaction device upon successive increments of movement of said valve element to the power position for gradually increasing said first-mentioned reaction force portion and thus gradually decreasing said boost ratio to thereby achieve a modified lower boost ratio as power run-out is approached.

12. In a power booster unit comprising a casing having a power wall actuated by a pressure differential on the opposite sides thereof, an output member connected to said wall, and a manually operable input member, the improvement comprising: a follow-up valve mechanism operated by said input member and having a released position, a power position, and a lapped position controlling the differential pressures on the opposite sides of said wall, said valve mechanism including a valve floatingly carried by said wall and a valve element operated by said manually operable input member and seating on said valve at the lapped position and at one of the other of said positions; reaction means including a resilient reaction device, said reaction device mechanically acting between said members and between the wall and said members, said reaction means transmitting a portion of the reaction force which corresponds to the force applied by said output member through said reaction device to said input member to oppose manual movement of said valve element to the power position, a further portion of the reaction force being applied through said reaction means to said power wall, said first-mentioned reaction force portion lightly opposing initial increments of movement of said valve element providing an initially high boost ratio of the manual force applied to the input member to the force supplied by the output member, said reaction means including means modifying the action of said resilient reaction device upon successive increments of movement of said valve element for gradually increasing said first-mentioned reaction force portion and thus gradually decreasing said boost ratio to thereby achieve a modified lower boost ratio as power run-out is approached; and means rigidly connecting said output member for direct actuation by said manually operated input member after power run-out.

13. In a power booster unit comprising a casing having a power wall actuated by a pressure differential on the opposite sides thereof, an output member connected to said wall, and an input member mounted axially of said output member, the improvement comprising: a follow-up valve mechanism operated by said input member and having a released position, a power position, and a lapped position for controlling the differential pressures on the opposite sides of said wall, said valve mechanism including a valve floatingly carried by said wall axially of said output member and adjacent said input member, and a valve element operably connected to said input member and seating on said valve at the lapped position and at one of the other of said positions; and reaction means including a resilient reaction device, said reaction means mechanically acting between said members and between the wall and said members, said reaction device comprising a heavier and a lighter spring connected between said input member and said output member providing a force lightly oposing initial increments of movement of said valve element to the power position with an initially high boost ratio of the force applied to the input member to that applied by the output member, successive increments of movement of said valve element tending to compress said resilient reaction device providing relative movement of said members and the wall stressing said heavier and lighter springs, said reaction means including means responsive to the relative movement of said members and the wall for gradually increasing said reaction force upon successive increments of movement of said valve element and gradually decreasing said boost ratio to thereby achieve a modified lower boost ratio as power run-out is approached.

14. In a power booster unit comprising a casing having a power wall actuated by a pressure differential on opposite sides thereof, an output member connected to said wall, and an input member, the improvement comprising: a follow-up valve mechanism operated by said input member and having a released position, a power position, and a lapped position for controlling the differential pressures on opposite sides of said wall, said valve mechanism including a valve floatingly carried by said wall and a valve element operably connected to said input member and seating on said valve at the lapped position and at one of the other of said positions; and reaction means including a resilient reaction device providing a reaction force lightly opposing initial increments of movement of said valve mechanism to the power position with an initially high boost ratio of the force applied to the input member to that applied by the output member, said reaction means mechanically acting between said members and between the wall and said members, said reaction means including means modifying the action of said resilient reaction device upon successive increments of movement of said valve element for gradually increasing said reaction force and gradually decreasing said boost ratio to thereby achieve a modified lower boost ratio as power run-out is approached.

15. In a power booster unit comprising a casing having a power wall actuated by a pressure differential on opposite sides thereof, an output member connected to said wall, and an input member, the improvement comprising, a follow-up valve mechanism operated by said input member and having a released position, a power position, and a lapped position for controlling the differential pressure on opposite sides of said wall, said valve mechanism including a valve floatingly carried by said wall and a valve element operably connected to said input member and seating on said valve at the lapped position and at one of the other of said positions, and reaction means including a yieldable connection between said output member and both said power wall and said input member providing reaction force lightly opposing initial increments of movement of said valve mechanism to the power position with an initially high boost ratio of the force applied to the input member to that applied by the output member, said yieldable connection having a variable deflection under load so that upon successive increments of movement of said valve element, and resultant movement of said power wall increasing the load on said connection, said connection is caused to yield and thereby gradually decreases said boost ratio.

16. In a power booster unit comprising a casing having a power wall actuated by a pressure differential on opposite sides thereof, an output member connected to said wall, and an input member, the improvement comprising, a follow-up valve mechanism operated by said input member and having a released position, a power position, and a lapped position for controlling the differential pressures on opposite sides of said wall, said valve mechanism including a valve floatingly carried by said wall and a valve element operably connected to said input member and seating on said valve at the lapped position and at one of the other of said positions, and reaction means including a yieldable device and a resilient device transmitting reaction force to said input member lightly opposing initial increments of movement of said valve mechanism to the power position with an initially high boost ratio of the force applied to the input member to that applied by the output member, said reaction means being connected between said output member and both said power wall and said input member, one of said devices having a variable rate of deflection under load, said one of said devices modifying transmission of reaction force from said output member upon successive increments of movement of said valve element, and resultant movement of said power wall, and thereby gradually decreasing said boost ratio as power run-out is approached.

17. A pressure producing device, in which physical force is supplemented by power assistance in a power applying stroke of the device to operate a brake, comprising, a power cylinder, a pressure responsive movable wall in the power cylinder, reaction transmitting means arranged to proportionately divide a reaction force varying with variations in the force exerted by the movable wall, an operator operated control member to control the operation of the movable wall, said control member being urged against the operator's force by the reaction means with a proportionate division of a reaction force from the reaction means, and a separately acting resilient ratio proportion changing force transmitting means operative with said reaction means to transmit and by flexure of the same to change the proportion of the reaction force applied by the reaction means to the control member in a shifting ratio during the power applying stroke of the device.

18. A pressure producing device in which physical force is supplemented by power assistance in a power applying stroke of the device to operate a brake, comprising, a power cylinder, a pressure responsive movable wall in the power cylinder, reaction transmitting means arranged to proportionately divide a reaction force varying with variations in the force exerted by the movable wall, an operator operated control member to control the operation of the movable wall, said control member being urged against the operator's force by the reaction means with a proportionate division of a reaction force from the reaction means, and a separately acting resilient ratio proportion changing force transmitting means operative with said reaction means to transmit and by flexure of the same to change the proportion of the reaction force applied by the reaction means to the control member in a shifting ratio at least during the initial portion of the power applying stroke of the device.

19. A pressure producing device, in which physical force is supplemented by power assistance in a power applying stroke of the device to operate a brake, comprising, a power cylinder, a press responsive movable wall in the power cylinder, reaction transmitting means arranged to proportionately divide a reaction force varying with variations in the force exerted by the movable wall, an operator operated control member to control the operation of the movable wall, said control member being urged against the operator's force by the reaction means with a proportionate division of a reaction force from the reaction means, and a separately acting resilient ratio proportion changing force transmitting means operative with said reaction means to transmit and by flexure of the same to change the proportion of the reaction force applied by the reaction means to the control member in a continuously changing ratio at least during the initial portion of the power applying stroke of the device.

References Cited by the Examiner
UNITED STATES PATENTS

| | | | |
|---|---|---|---|
| 2,547,233 | 4/51 | Seppmann | 60—54.6 |
| 2,552,048 | 5/51 | La Brie | 60—54.6 |
| 2,685,170 | 8/54 | Price | 60—54.6 |
| 2,685,172 | 8/54 | Price | 60—54.6 |
| 2,690,740 | 10/54 | Hupp | 121—41 |
| 2,818,835 | 1/58 | Hupp | 121—41 |
| 2,826,041 | 3/58 | Rike | 121—41 |
| 2,894,490 | 7/59 | Ingres | 121—41 |
| 2,903,855 | 9/59 | Randol | 60—54.6 |
| 2,977,935 | 4/61 | Randol | 121—41 |
| 3,013,536 | 12/61 | Cripe | 121—41 |
| 3,016,881 | 1/62 | Wilkens et al. | 121—41 |
| 3,033,173 | 5/62 | Bauman | 91—369 |

FRED E. ENGELTHALER, Primary Examiner.

SAMUEL LEVINE, KARL J. ALBRECHT, RALPH H. BRAUNER, Examiners.

UNITED STATES PATENT OFFICE
CERTIFICATE OF CORRECTION

Patent No. 3,165,031

January 12, 1965

Edward A. Rockwell

It is hereby certified that error appears in the above numbered patent requiring correction and that the said Letters Patent should read as corrected below.

Column 13, line 50, strike out "said"; column 18, line 8, for "press" read -- pressure --.

Signed and sealed this 28th day of September 1965.

(SEAL)
Attest:

ERNEST W. SWIDER
Attesting Officer

EDWARD J. BRENNER
Commissioner of Patents